United States Patent [19]
Krynitz et al.

[11] Patent Number: 5,391,265
[45] Date of Patent: Feb. 21, 1995

[54] PROCESS FOR THE PRODUCTION OF PURE NICKEL HYDROXIDE AND ITS USE

[75] Inventors: Ulrich Krynitz, Goslar; Dirk Naumann, Bad Harzburg; Armin Olbrich, Seesen, all of Germany

[73] Assignee: H. C. Starck GmbH & Co. KG, Goslar, Germany

[21] Appl. No.: 152,719

[22] Filed: Nov. 16, 1993

[30] Foreign Application Priority Data

Nov. 23, 1992 [DE] Germany .............. 4239295

[51] Int. Cl.⁶ .............................. C25B 1/16
[52] U.S. Cl. ........................ 204/96; 205/60
[58] Field of Search ........... 204/96; 429/223; 205/57, 60

[56] References Cited

U.S. PATENT DOCUMENTS

| | | |
|---|---|---|
| 3,466,231 | 9/1969 | MacArthur . |
| 4,265,718 | 5/1981 | Limare et al. . |
| 4,540,476 | 9/1985 | Dyer . |

FOREIGN PATENT DOCUMENTS

| | | | |
|---|---|---|---|
| 792737 | 8/1968 | Canada . | |
| 0014111 | 8/1980 | European Pat. Off. | ....... C25B 1/00 |
| 0559590 | 9/1993 | European Pat. Off. | ....... C25B 1/00 |
| 1441749 | 4/1965 | France ............. | C01G 4/00 |
| 366495 | 12/1938 | Italy . | |
| 1600750 | 5/1978 | United Kingdom | ........... C25B 1/00 |

OTHER PUBLICATIONS

S. G. Real et al "Influence of Chloride Concentration on the Active Dissolution and Passivation of Nickel Electrodes in Acid Sulfate Solutions" J. Electrochem. Soc., vol. 137, No. 6, Jun. 1990.

*Primary Examiner*—John Niebling
*Assistant Examiner*—Brendan Mee
*Attorney, Agent, or Firm*—Jerry Cohen

[57] ABSTRACT

The invention relates to a process for the production of pure nickel hydroxide by anodic oxidation of metallic nickel in aqueous electrolyte solution in the presence of sulfate ions and removal of the nickel hydroxide formed and to the use of the nickel hydroxide thus produced.

10 Claims, No Drawings

PROCESS FOR THE PRODUCTION OF PURE NICKEL HYDROXIDE AND ITS USE

This invention relates to a process for the production of pure nickel hydroxide by anodic oxidation of metallic nickel in aqueous electrolyte solution in the presence of sulfate ions and removal of the nickel hydroxide formed and to the use of the nickel hydroxide thus produced.

BACKGROUND OF THE INVENTION

Nickel hydroxide is normally obtained by the reaction of nickel salts with alkali metal hydroxides. The nickel starting solutions are obtained in a first stage by digestion of metallic nickel, for example with $HNO_3$. The hydroxide is obtained in a second stage by subsequent precipitation with alkali metal hydroxides. The disadvantages of these processes are, on the one hand, the poor filterability of the nickel hydroxide gel formed. The neutral salts formed and the excess alkali metal hydroxide are also very difficult to remove from the precipitate. Non-stoichiometric basic nickel salts are precipitated in particular from nickel chloride and/or sulfate solutions and are obstacles to conversion into pure hydroxide. In addition, stoichiometric quantities of neutral salts are unavoidably formed in the hydroxide precipitation step and have to be disposed of through the wastewater.

The electrolytic preparation of pure nickel hydroxide from metallic nickel in aqueous solutions of alkali metal salts is described in Italian patent 366 495. The unwanted formation of basic salts is mentioned in this document, too, and is counteracted by elaborate and hence uneconomical equipment-related measures.

The formation of nickel hydroxide in electrolytic processes has also been repeatedly observed as a secondary reaction and is described, for example, in J. Elektrochem. Soc., Vol. 137, No. 6, 1990, pages 1696 to 1702. According to this reference, the anodic formation of an $Ni(OH)_2$ layer on nickel electrodes was observed in voltametric measurements in sulfuric acid sulfate electrolyte solutions containing potassium chloride. The experimental results in this reference provide no indication as to how pure nickel hydroxide can be electrochemically produced on an industrial scale.

The object of the present invention is to provide an ecologically safe process for the production of nickel hydroxide which does not have any of the disadvantages of the described prior art.

SUMMARY OF THE INVENTION

It has now surprisingly been found that the anodic oxidation of metallic nickel in aqueous electrolyte solutions containing both sulfate and chloride leads to a nickel hydroxide intermediate product which may be economically converted into pure nickel hydroxide by treatment with alkali metal hydroxides.

Accordingly, the present invention relates to a process for the production of pure nickel hydroxide by anodic oxidation of metallic nickel in aqueous electrolyte solution in the presence of sulfate ions and removal of the nickel hydroxide formed, characterized in that a nickel hydroxide containing chloride and sulfate is first prepared and then converted into pure nickel hydroxide by aftertreatment with alkali metal hydroxides.

The process according to the invention may advantageously be carried out with low concentrations of sulfate and chloride ions. Thus, the concentration of sulfate ions is preferably 0.001 to 2.0 molar and, more preferably, 0.01 to 1.0 molar. The preferred concentration of chloride ions is 0.3 to 5 molar and, more preferably, 0.5 to 2 molar. Particularly good results are obtained if the electrolyte solution contains an excess of chloride ions over sulfate ions. The molar ratio of chloride ions to sulfate ions is 200:1 to 1:1 and, more preferably, 100:1 to 10:1.

The process according to the invention is preferably carried out at pH values of 6 to 13 and, more preferably, at pH values of 8 to 12. At lower pH values, the nickel hydroxide is dissolved whereas, at very high pH values, there is normally no formation of basic salts. Instead, a firmly adhering nickel hydroxide can be formed on the anode under these conditions, interfering with the flow of current in the electrolysis cell. In addition, a homogeneous reproducible product cannot be obtained in this way.

DETAILED DESCRIPTION OF THE PREFERRED EMBODIMENT

In a particularly preferred embodiment of the process according to the invention, the chloride and sulfate ions are introduced in the form of alkali metal and/or nickel salts. These salts may advantageously be circulated throughout the entire production process.

In cases where the pure nickel hydroxide according to the invention is intended to contain doping elements, as is sometimes required of nickel hydroxide for the production of batteries, the process according to the invention may advantageously be carried out in the presence of cadmium, cobalt, magnesium, calcium and/or zinc salts preferably used as sulfate and/or chloride salts. The maximum content of these elements is 10% of the $Ni(OH)_2$.

In another advantageous embodiment, the pure nickel hydroxide may be prepared in the presence of cadmium, cobalt, magnesium and/or zinc, these elements serving as metal anodes.

Good yields are achieved with current densities of approx. 500 to 2000 $A/m^2$.

The main product obtainable by the process according to the invention is a gel of very high water content (approx. 90% $H_2O$) which readily lends itself to filtration. The filtrate may advantageously be returned as electrolyte to the electrolysis cell.

This main product still contains a few percent chloride and sulfate, although they may readily be removed in the alkaline aftertreatment. The alkali metal hydroxides used are preferably potassium and/or sodium hydroxides in a concentration of $10^{-3}$ to 2 molar and preferably in a concentration of $10^{-2}$ to 0.5 molar, the alkali metal hydroxide required advantageously being circulated.

The aftertreatment according to the invention may be carried out particularly economically over periods of 1 to 48 hours at temperatures of 20° to 80° C.

In the overall balance, therefore, only that quantity of neutral salt which is present as an impurity in the nickel hydroxide is discharged into the wastewater. Compared with conventional processes for the production of nickel hydroxide by precipitation from nickel salts, the electrochemical production process according to the invention represents a reduction in the neutral salt occurrence of at least 90%. The process according to the invention is particularly easy to carry out because it does not involve the use of membranes or diaphragms.

The pure nickel hydroxide produced in accordance with the invention ideally fulfills the requirements which an anode material for nickel/cadmium and/or nickel hydride batteries is expected to satisfy. It has a high apparent density and tamped density so that a high volume-specific storage capacity can be achieved in the battery. In addition, anionic impurities which can have an adverse effect on the electrochemical properties of the batteries are only present in very low concentrations of preferably below 0.2%. Other physical characteristics are, for example, a high specific surface of the nickel hydroxide and a high half-intensity width of the 101 X-ray diffraction reflex of the nickel hydroxide which provides information on the degree of crystallization. The particle sizes are in the range of 1 to 250 μm.

Accordingly, the present invention also relates to the use of the nickel hydroxide produced in accordance with the invention as an anode material in nickel/cadmium batteries and/or nickel hydride batteries.

The following Examples are intended to illustrate the invention without limiting it in any way.

Comparison Example 15 g NaCl and 1 g $NiCl_2 \cdot 6 H_2O$ were dissolved in 300 ml water. Electrolysis was then carried out with stirring at room temperature at 4 volts and at a current density of 1200 A/m². A rapidly sedimenting gel was formed; after treatment with NaOH (pH 13.5), the gel gave a nickel hydroxide product containing 0.4% chloride.

EXAMPLE 1 a) Electrolysis

An electrolysis reactor consisting of an electrolysis cell (70 l) was filled with 200 l sodium chloride solution (50 g NaCl/l) and the electrolyte solution was continuously circulated between the two vessels by a rotary pump. Two tantalum baskets, of which the sides were in the form of sieves and which were filled with Ni briquettes, were suspended in the electrolysis cell. The tantalum baskets were connected as anode and pure nickel plates connected as cathode were arranged opposite the sides so that the total electrode surface area was 0.5 m². Electrolysis was carried out with 4.2 V/500 A at a current density of 1000 A/m². During electrolysis, 200 ml per hour of a solution of nickel sulfate and cobalt sulfate (250 g $NiSO_4 \cdot 7H_2O$/l; 250 g/l $CoSO_4 \cdot 7 H_2O$) were continuously introduced into the electrolysis cell.

After 5 h, 40 l/h of the suspension formed was continuously removed from the circulation vessel and, at the same time, fresh sodium chloride solution was pumped into the electrolysis cell so that the liquid volume in the electrolysis reactor remained constant. The suspension was then filtered in batches and, in the further course of the electrolysis process, the filtrate was returned to the electrolysis cell instead of the fresh sodium chloride solution. Accordingly, the additional sodium chloride solution was only used in the initial phase of the continuous process, after which a closed loop was established under steady-state reator operating conditions. The suspension was easy to filter, giving a gel-like main product with a water content of on average 90%. The water removed was returned to the system as washing water for the gel-like main product. Chemical analysis revealed an average sulfate content of 1.8% and an average chloride content of 2% in the dried gel. The overall duration of the test was 105 h. In continuous operation, a total of 870 kg gel-form main product was obtained over that period.

b) Conditioning in NaOH 200 kg of the moist gel-like main product from the electrolysis reactor were finely dispersed by intensive stirring with 200 l water in a heated double-jacket reactor. The pH was then adjusted to 13.7 with NaOH, after which the suspension was heated with stirring to 80° C. and kept at that temperature for 6 h.

The suspension was then filtered through a nutsch filter and the product from the nutsch filter was washed with water. After drying in a drying cabinet, 19.7 kg nickel hydroxide powder containing 1% Co were obtained. The anionic impurities of the dry powder amounted to less than 500 ppm. The apparent density (ASTM B-329) was 1.3 g/cm³ and the tamped density (ASTM; B-527) 1.8 g/cm³. The specific BET surface (as measured by the nitrogen method-ASTM D-1993) showed the very high value of 88 m²/g. The half-intensity width of the 101 reflex was 2.0.

We claim:

1. A process for the the production of essentially pure nickel hydroxide comprising the steps of:
    (a) providing metallic nickel source material in aqueous electrolyte solution which includes sulfate ions and chloride ions, the concentration of sulfate ions being in the range of 0.001 to 2.0 molar and the concentration of the chloride ions being in the range of 0.3 to 5 molar, the molar ratio of chloride to sulfate ions being in the range of from 200:1 to 1:1;
    (b) conducting a substantially continuous anodic oxidation of the nickel in the solution to form nickel hydroxide while maintaining said concentrations of sulfate and chloride ions and molar ratio ranges and a pH of 6 to 13 in the solution and removing such nickel hydroxide from said solution;
    (c) treating the nickel hydroxide by exposure, in a post-anodic treatment solution, to alkali metal hydroxide in a concentration of $10^{-3}$ to 2 molar for a period of 1 to 48 hours at a temperature of 20° to 80° C. and at elevated pH compared to pH of the electrolysis solution;
    (d) filtering and drying,
to thereby obtain an essentially pure nickel hydroxide product with high density, high surface area and a high degree of crystallinity.

2. A process as in claim 1 wherein:
    (a') the concentration of sulfate ions in the electrolyte solution is 0.01 to 1:0 molar, the concentration therein of chloride ions is 0.5 to 2 molar and the ratio therein of chloride to sulfate ions is in the range 100:1 to 10:1, at least one of the chloride and sulfate ions being provided to the electrolyte solution as salts thereof selected from the class consisting of nickel and alkali metal salts thereof and further comprising the introduction of metal ions into the electrolyte solution by provision therein of a source of metal selected from the class consisting of cadmium, cobalt, zinc and combinations thereof and anodically freeing metal ions from at least one source of such material into solution during the anodic oxidation of the nickel,
    (b') the said concentrations of sulfate and chloride ions and molar ratio ranges and pH of 8 to 12 being maintained during anodic oxidation, and
    (c') the alkali metal hydroxide of the post anodic treatment solution being provided in a range of $10^{-2}$ to 0.5 molar.

3. A process as in claim 1 wherein a pH value of 8 to 12 is maintained in the electrolysis solution.

4. A process as in claim 1, characterized in that the sulfate and chloride ions are introduced in the form of salts thereof selected from the group consisting of alkali metal and nickel salts.

5. A process as in claim 1, characterized in that the preparation of the nickel hydroxide is carried out in the presence of one or more additional metal values via metal salts selected from the group consisting of cadmium, cobalt, magnesium, calcium and zinc salts.

6. A process as in claim 5, wherein the metal salts are provided as salts with anions selected from the group consisting of sulfate and chloride.

7. A process as in claim 6, characterized in that additional metal values are provided as secondary anodes of such metals for electrolytic treatment along with the anodic oxidation of nickel.

8. A process claim 1, characterized in that an akali metal hydroxide selected from the group consisting of potassium and sodium hydroxides in a concentration of $10^{-3}$ to 2 molar is used as the alkali metal hydroxide or hydroxides of the said after-treatment post anodic treatment step.

9. A process as in claim 8, wherein the akaline metal hydroxide of the after-treatment step is provided in a concentration of $10^{-2}$ to 0.5 molar.

10. A process as in claim 1 characterized in that metal hydroxide selected from the class consisting of potassium and sodium hydroxides in a concentration of $10^{-3}$ to 2 molar is used as the alkali metal.

* * * * *